UNITED STATES PATENT OFFICE.

RICHARD BISHOP MOORE, OF DENVER, COLORADO.

PROCESS OF EXTRACTING VANADIUM, URANIUM, AND RADIUM FROM ORES.

1,165,693.  Specification of Letters Patent.  Patented Dec. 28, 1915.

No Drawing. Continuation of application Serial No. 793,970, filed October 7, 1913. This application filed January 22, 1914. Serial No. 813,818.

(DEDICATED TO THE PUBLIC.)

*To all whom it may concern:*

Be it known that I, RICHARD BISHOP MOORE, a resident of Denver, in the county of Denver and State of Colorado, have invented certain new and useful Improvements in Processes of Extracting Vanadium, Uranium, and Radium from Ores; and I do hereby declare the following to be a full, clear, and exact description of my invention.

This application is made under the act of March 3, 1883, chapter 143 (U. S. Statute XXII., p. 625) and the invention herein described and claimed may be used by the Government of the United States or any of its officers or employees in the prosecution of the work of the United States, or by any person in the United States without the payment of any royalty thereon.

This application is a continuation of application #793,970, filed October 7, 1913, in so far as the disclosure therein is embodied in the present specification.

This invention relates to a process of treating ores and more particularly to a process of extracting vanadium, uranium, and radium from ores containing the same, such as cornotite ores.

The object of my invention is a process of treating ores whereby the values contained therein are brought into solution by a single leaching step, from which solution said values may be successively separated.

In carrying out my process I proceed substantially as follows: The ore, with or without previous roasting, and ground to a suitable degree of fineness, is leached with a solution of nitric or hydrochloric acid, preferably kept hot, or a mixture of both. The strength of the acid used depends upon the character of the ore and is regulated according to the quantity of sulfates contained therein. When nitric acid is used a solution of one volume of nitric acid (sp. gr. 1.42) to one volume of water is satisfactory with ordinary ores. If hydrochloric acid is used the preferable strength is an acid of 18° B.

After the ore has been treated with hot acid the solution is removed from the insoluble residue by decantation or filtration and the residue is washed, first with HCl or $HNO_3$ depending on which has been used for leaching, and then with water to recover all soluble material. By the leaching step nearly all of the uranium and vanadium and a larger portion of the radium contained in the ore is dissolved in the form of nitrates or chlorids, and as hot acids have also a distinct solvent action for barium and radium sulfates these also may be in the solution. A quantity of barium chlorid solution is now added to the solution containing the values together with a sufficient quantity of a solution containing a sulfate radical such as sodium sulfate or sulfuric acid to convert the barium and radium salts into sulfates. The barium and radium sulfates if present in quantity sufficient to more than saturate the acid solution are precipitated in part, leaving, however, a portion of these sulfates in solution. After standing for several hours, the solution may be decanted or filtered from the insoluble residue. Separation of solution from precipitate at this point may, however, be omitted.

If hydrochloric acid has been used as a leaching agent a small amount of nitric acid may be added to the hot liquid to oxidize the iron and other oxidizable compounds which are present.

To the acid solution from which the barium and radium sulfates may or may not have been partly removed an excess of an alkali hydrate, such as sodium or potassium hydrate is added. By this means the vanadium salts are converted into soluble sodium vanadate, together with any aluminum present, as sodium aluminate. Uranium and iron are precipitated together with any radium which was not precipitated together with the barium sulfate in the acid solution. The precipitate is removed by any suitable means. The vanadium may be precipitated from the sodium vanadate solution as iron, copper, lead, barium or other insoluble vanadate.

The precipitate, containing uranium, iron, and radium is treated with dilute sulfuric or hydrochloric acid. A little barium chlorid is added and the insoluble sulfates carrying radium are removed from the solution and preserved, with any radium bearing material from a preceding step of the process, for further treatment to recover radium. The solution containing uranium and iron is then boiled with an excess of sodium carbonate. The iron is thus precipitated and the uranium is converted into soluble sodium uranyl carbonate. This solution is decanted or filtered and the uranium is recovered by precipitating with sodium hydroxid or other suitable reagent.

Instead of making one precipitation with sodium hydroxid and one with sodium carbonate, two precipitations with sodium carbonate may be made. Under such conditions the first precipitate will carry the iron, the aluminum and the radium and some of the vanadium and uranium. Most of the vanadium and uranium will be in the filtrate. These can be separated by adding sodium hydroxid to the solution, thereby precipitating the uranium and, after filtration, the vanadium can be precipitated in the usual way as a metallic vanadate. The precipitate carrying the iron, radium, etc., is treated in the same way as if sodium hydroxid were used, namely, it is dissolved in dilute sulfuric or hydrochloric acids, or a mixture of these two, depending upon the amount of alkaline earths present in the ore. On the addition of barium chlorid the insoluble sulfates carrying the radium are removed from the solution and preserved with any radium bearing material from a preceding step of the process for further treatment to recover radium. If a sufficient amount of alkaline earths are present, the addition of barium chlorid is not necessary. A second precipitation of the iron and aluminum with sodium carbonate removes a further amount of uranium and vanadium which are separated from each other in the manner already described.

Having fully described my invention, what I claim as new and desire to secure by Letters Patent is:

1. The process of recovering values from radium bearing ores which consists in leaching the ore with an acid solution and precipitating the radium from this solution.

2. The process of recovering values from radium bearing ores which consists in leaching the ore with an acid solution and precipitating the radium as a sulfate from the solution.

3. The process of recovering values from radium bearing ores which consists in leaching the ore with an acid solution and precipitating barium sulfate in the solution, together with radium sulfate.

4. The process of recovering values from radium bearing ores which consists in leaching the ore with an acid solution and adding barium chlorid and a solution containing a sulfate radical, whereby barium sulfate is precipitated together with radium sulfate.

5. The process of recovering values from radium bearing ores which consists in leaching the ore with an acid solution and adding barium chlorid and sulfuric acid, whereby barium sulfate is precipitated together with radium sulfate.

6. The process of recovering values from radium bearing ores which consists in leaching the ore with a nitric acid solution and precipitating the radium from this solution.

7. The process of recovering values from radium bearing ores which consists in leaching the ore with a nitric acid solution and precipitating the radum as a sulfate from the solution.

8. The process of recovering values from radium bearing ores which consists in leaching the ore with a nitric acid solution and precipitating barium sulfate in the solution together with radium sulfate.

9. The process of recovering values from radium bearing ores which consists in leaching the ore with a nitric acid solution and adding barium chlorid and a solution containing a sulfate radical, whereby barium sulfate is precipitated together with radium sulfate.

10. The process of recovering values from radium bearing ores which consists in leaching the ore with a nitric acid solution and adding barium chlorid and sulfuric acid, whereby barium sulfate is precipitated together with radium sulfate.

11. The process of recovering values from ores containing vanadium, uranium and radium which consists in leaching the ore with an acid solution adding barium chlorid and a solution containing a sulfate radical to said acid solution, whereby part of the barium sulfate is precipitated together with part of the radium sulfate; adding an alkali hydrate to the solution whereby uranium and any remaining barium sulfate and radium sulfate is precipitated, recovering vanadium from the solution and treating the precipitate to recover uranium and radium.

12. The process of recovering values from ores containing vanadium, uranium and radium which consists in leaching the ore with an acid solution, adding barium chlorid and a solution containing a sulfate radical to said acid solution, whereby part of the barium sulfate is precipitated together with part of the radium sulfate; adding an alkali and recovering vanadium, uranium and radium.

13. The process of recovering values from ores containing vanadium, uranium and radium which consists in leaching the ore with an acid solution, adding a halogen compound of barium and a compound containing a sulfate radical to said acid solution, whereby barium sulfate is precipitated together with a portion of the radium as a sulfate, adding an alkaline solution, whereby uranium and any remaining barium and radium is precipitated, recovering vanadium from the solution, treating the precipitate with an acid, precipitating radium from the solution thus formed and recovering uranium from this solution.

In testimony whereof I have signed this specification in the presence of the two subscribing witnesses.

RICHARD BISHOP MOORE.

Witnesses:
C. F. WHITTEMORE,
TRACY E. MULLIGAN.